United States Patent [19]

Stapp et al.

[11] Patent Number: 5,447,797
[45] Date of Patent: Sep. 5, 1995

[54] REACTION RESIN MIXTURE COMPRISING EPOXY RESIN, BENZYLTHIOLANIUM SALT AND SENSITIZER

[75] Inventors: Bernhard Stapp, Issaquah, Wash.; Lothar Schoen, Neunkirchen; Volker Muhrer, Nuremberg, both of Germany

[73] Assignee: Siemens Aktiengesellschaft, Munich, Germany

[21] Appl. No.: 104,227

[22] Filed: Aug. 9, 1993

[30] Foreign Application Priority Data

Aug. 10, 1992 [DE] Germany .................. 42 26 444.8

[51] Int. Cl.$^6$ .................................. G03C 1/68
[52] U.S. Cl. .................................. 428/413; 430/270; 430/280; 430/281; 430/288; 430/914; 430/915; 430/921; 430/922; 430/923; 522/15; 522/25; 525/504; 525/505; 528/90; 528/361; 528/408
[58] Field of Search .......... 522/15, 25; 528/90, 528/361, 408; 525/504, 505; 430/280, 270, 281, 288, 914, 915, 921, 922, 923; 204/159.18, 159.23, 159.24; 428/413

[56] References Cited

U.S. PATENT DOCUMENTS

| | | | |
|---|---|---|---|
| 4,058,401 | 11/1977 | Crivello | 96/115 |
| 4,138,255 | 2/1979 | Crivello | 96/35.1 |
| 4,398,014 | 8/1983 | Green et al. | 528/90 |
| 4,442,197 | 4/1984 | Crivello et al. | 430/280 |
| 5,013,814 | 5/1991 | Roth et al. | 528/90 |

FOREIGN PATENT DOCUMENTS

| | | |
|---|---|---|
| 0011918 | 6/1980 | European Pat. Off. |
| 0331496 | 9/1989 | European Pat. Off. |
| 0369194 | 5/1990 | European Pat. Off. |
| 58-37003 | 3/1983 | Japan |
| 63-152619 | 6/1988 | Japan |
| WO90/11303 | 10/1990 | WIPO |

OTHER PUBLICATIONS

Crivello, J. V., "Cationic Polymerization—Iodonium and Sulfonium Salt Photoinitiators," *Adv. Polym. Sci.*, vol. 62 (1984), pp. 1–48.

Morio, K. et al., "Thermoinitiated Cationic Polymerization of Epoxy Resins by Sulfonium Salts," *Journal of Applied Polymer Science*, vol. 32 (1986), pp. 5727–5732.

Sundell, P. et al., "Thermally Induced Cationic Polymerization of Divinyl Ethers Using Iodonium and Sulfonium Salts," Journal of Polymer Science, Part A: Polymer Chemistry, vol. 29 (1991), pp. 1535–1543.

*Primary Examiner*—Frederick Krass
*Attorney, Agent, or Firm*—Kenyon & Kenyon

[57] ABSTRACT

A reaction resin mixture, which is able to be hardened thermally and by means of UV radiation, contains the following constituents:
- a cationically polymerizable epoxide resin;
- a latent hardening initiator in the form of an aralkyl-thiolanium salt; and
- a sensitizer of the structure

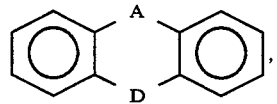

A being —CO—, —NR— and —CO—CO—, and D being —O—, —S—, —CO— and —CH$_{2x}$ (where x = 1 or 2) or rather a single bond or two hydrogen atoms.

19 Claims, No Drawings

REACTION RESIN MIXTURE COMPRISING EPOXY RESIN, BENZYLTHIOLANIUM SALT AND SENSITIZER

FIELD OF THE INVENTION

The invention relates to a hardenable, reaction resin mixture as well as to its application.

BACKGROUND OF THE INVENTION

Epoxide resins are often used as reaction resins to coat or bond electronic components and modules. These epoxide resins are then hardened. Reaction resin mixtures having an epoxide resin base can be activated to harden—when the right accelerators or initiators are present—both thermally as well as by means of UV radiation. Known initiators for hardening in accordance with a cationic mechanism are sulfonium salts, which—depending upon the chemical constitution—form the initiating species through thermal or photochemical activation.

Sulfonium salts that are capable of being thermally activated are described, for example, in *J. Polym. Sci. Polym. Chem. Ed.*, vol. 29 (1991), pp. 1535-1543. Benzylthiolanium salts having non-nucleophilic anions, which are suited for the cationic polymerization, such as $PF^-_6$, $SbF^-_6$ and $BF^-_4$, are of particular technical interest (c.f. JP-Unexamined Patent Application 58-37003 or *Chemical Abstracts*, vol. 99 (1983), no 141034v and *J. Appl. Polym. Sci.*, vol. 32 (1986), pp. 5727-5732). In many cationically polymerizable reaction resin mixtures, these compounds demonstrate adequate latency at room temperature, i.e., formulations containing benzylthiolanium salts as hardening initiators are stable in storage. The European Unexamined Patent Application 0 379 464 describes araliphatic sulfonium salts, such as diethylbenzyl-sulfoniumhexafluoro antimonate, which are likewise supposedly suited as latent hardening initiators. However, the mentioned sulfonium-salt compounds are only suited for the thermally activated hardening of cationically polymerizable compounds.

Furthermore, it is known that the UV hardening of cationically polymerizable compounds can be initiated by triarylsulfonium salts (c.f., e.g., U.S. Pat. No. 4,058,401 and U.S. Pat. No. 4,138,255). An important characteristic of triarylsulfonium salts is their high thermal stability (c.f.: *Adv. Polym. Sci.*, vol. 62 (1984), pp. 1-48). This means, however, that triarylsulfonium salts are unsuited for the thermal hardening of cationically polymerizable compounds.

For the combined thermal and UV hardening of cationically polymerizable compounds, which is technically desirable, sulfonium salts are known, which are able to be activated thermally and photochemically. These properties are demonstrated by sulfonium salts that are heterocyclic, aryl-substituted or anellated with an aryl system (c.f. WO 90/11303), as well as by phenylbenzylalkyl sulfonium salts (c.f. EP Unexamined Patent Application 0 331 496) and naphthalene sulfonium salts (c.f. JP Unexamined Patent Application 63-152619 or *Chemical Abstracts*, vol. 109 (1988), no 232200n). However, the technical applicability of many of these compounds is clearly restricted by a number of disadvantages. These include, in particular, the often too low solubility in technically practical formulations and the often too low UV absorption above 315 nm. The result is that the UV-A radiation from the mercury-radiation emitter used principally for the UV hardening is not absorbed effectively. However, a hardening initiation with UV-A radiation is especially desired in the case of thick layers, since it achieves a greater penetration depth and allows fewer scattering losses to occur. Moreover, due to occupational safety and health considerations, a hardening with UV-A radiation can also be desirable, since—compared to UV-B and UV-C radiation—this radiation clearly has less of a photobiological effect.

From a standpoint of technology and economics, it is an important task, for example in the field of electronics, to harden a cationically polymerizable reaction resin mixture, that is stable in storage as a single-component system, by means of UV radiation and heating. Thus, a combined hardening in the coating (lacquering, covering, sheathing) and bonding of electronic components and modules is always necessary when there are regions that are shaded from light, where the reaction resin cannot be reached by the UV radiation, and which, therefore, must be thermally hardened. A combined hardening is also necessary, when, for technical reasons, the reaction resin mixture contains additives, such as fillers, pigments, and dyes, or also resinous constituents, which absorb or scatter the UV radiation in the upper layers so heavily, that there is no longer sufficient UV intensity in the deeper layers. This is the case, for example, when unhoused ICs are covered locally on hybrid circuits by means of a reaction resin drop.

SUMMARY OF THE INVENTION

The object of the invention is to prepare epoxy based, cationically hardenable reaction resin mixtures, which demonstrate good storage properties and ease of use as single-component system, sand which harden quickly as a result of UV radiation, particularly in the UV-A range of 315 to 400 nm, and at temperatures of over 80° C.

This is achieved, according to the invention, with reaction resin mixtures containing the following constituents:

a cationically polymerizable epoxide resin (epoxy resin);

a latent hardening initiator of the structure

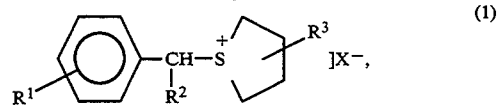

where the following applies:
$R^1$=hydrogen, alkyl, aryl, O-alkyl, S-alkyl, vinyl, $CF_3$, halogen, CN, $NO_2$ or an anellated aromatic system;
$R^2$=hydrogen, alkyl or aryl;
$R^3$=hydrogen, alkyl or aryl or the thiolane ring is a constituent of an aromatic system;
$X^-$=$PF^-_6$, $AsF^-_6$, $SbF^-_6$ or $SbF_5OH^-$, and
a sensitizer of the structure

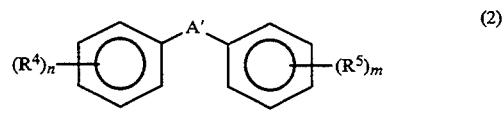

where $A'$=—CO—, —CO—CO—,

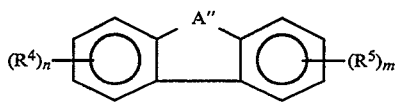

where A″=—CO—, —NR—, —CO—CO—, or

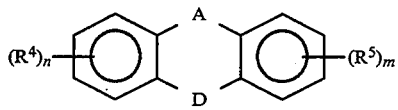

where A=—CO—, —NR—, and D=—O—, —S—, —CO—, —CO$_{2x}$
where x=1 or 2,
when A=—CO—, or
D=—O—, —S—, —CO—,
when A=—NR—,
where the following applies:
$R^4$ and $R^5$=hydrogen, alkyl, aryl, aralkyl, O-alkyl, S-alkyl, COO-alkyl, N(alkyl)$_2$, halogen, OH or CN, and
n and m=0, 1, 2 or 3, and wherein R is alkyl or hydrogen.

Surprisingly, it has been discovered that the special sensitizers, which are contained in the reaction resin mixtures according to the invention and which absorb in the UV range, are able to transfer the energy absorbed during UV absorption to the hardening initiators and, in this manner, to form active species. These species, in turn, initiate a cationic polymerization. It could not have been foreseen that out of the myriad of known sensitizers and dyes, these particular compounds would demonstrate a sensitizing effect on the special hardening initiators. However, in doing this, they do not reduce the storage stability of the reaction resin mixtures and also do not have any retarding effect on the cationic hardening process.

DETAILED DESCRIPTION OF THE INVENTION

Glycidyl ethers based on bisphenol A, bisphenol F or novolaks are preferably used as cationically polymerizable epoxide resins in the reaction resin mixtures according to the invention. Glycidyl ethers of glycerin and pentaerythritol, however, are also suited.

In addition, linear aliphatic epoxide resins, such as epoxidized polybutadiene and epoxidized soybean oil, and cycloaliphatic epoxide resins, such as 3,4 epoxy-cyclohexylmethyl-3′,4′-epoxycyclohexanecarboxylate are preferred. The latter are distinguished in particular by a high reactivity, as well as by a low viscosity. Furthermore, mixtures of cationically hardenable epoxide resins can also be employed.

To increase the rate of hardening and to improve the mechanical properties of the molded material, organic compounds containing hydroxyl groups, i.e., hydroxyl or polyhydroxyl compounds, as well as their vinyl ethers, can be advantageously added to the reaction resin mixtures. Preferably, polyoxyalkylene polyols, polyalkylene polyols and cycloaliphatic hydroxyl compounds are used as hydroxyl-group-containing compounds. Besides vinyl ethers of the mentioned type, other vinyl-group-containing compounds can also be applied.

The latent hardening initiator is an aralkyl-thiolanium salt of structure (1). A benzyl-thiolanium-hexafluoroantimonate is preferably employed, i.e., a compound of structure (1), $R^2$ and $R^3$ being hydrogen in each case and $X^-$ being $SbF^-_6$. The aralkyl-thiolanium salts are employed in concentrations of 0.01 to 5%, preferably in concentrations of 0.05 to 3%, in each case in relation to the epoxide resin.

The sensitizer, which absorbs in the UV-A range, is a compound of the structure (2), (3) or (4). Preferred sensitizer are:

Benzophenones, i.e., compounds of the structure (2), where A′=—CO—, such as unsubstituted benzophenone, as well as 4-phenyl-, 4,4′-dimethyl- and 4,4′-bis(dimethylamino)-benzophenone (Michler's ketone); especially preferred is 4-phenylbenzophenone.

Phenanthrenequinones, i.e., compounds of the structure (3), where AA=—CO—CO—, such as unsubstituted phenanthrenequinone as well as 1-chloro-phenanthrenequinone; especially preferred is the unsubstituted compound.

Thioxanthones, i.e., compounds of the structure (4), where A=—CO— and D=—S—, such as unsubstituted thioxanthone as well as 2-isopropyl-, 2,4-dimethyl-, and 2,4-dichlorothioxanthone; especially preferred is the unsubstituted compound and 2-isopropylthioxanthone.

Phenothiazines, i.e., compounds of the structure (4), where A=—NR— and D=—S—, such as unsubstituted phenothiazine as well as N-methyl-, 2-phenyl-, 2-methoxy- and 2-acetylphenothiazine; especially preferred is N-methylphenothiazine.

In addition, the following compounds or derivatives thereof can be used as sensitizers: benzil, fluorenone, carbazole, xanthone, phenoxazine, anthraquinone, acridinone, anthrone, and dibenzosuberone. The sensitizers are used in concentrations of 0.01 to 5%, preferably in concentrations of 0.05 to 2%, in each case in relation to the epoxide resin. The quantity that is employed is especially dependent upon the thickness of the layer to be hardened, upon the extinction coefficient of the employed sensitizer, and of the UV radiation source, and,if necessary, is determined experimentally.

Reaction resin mixtures in accordance with the invention are single-component mixtures which are stable in storage at room temperature. A high level of storage stability is an important prerequisite for achieving simple processing of reaction resin mixtures. The reaction resin mixtures according to the invention generally demonstrate a storage stability which suffices for the technology. However—depending on the composition of the mixture—it can be advantageous to add stabilizing components to further enhance storage stability. Tertiary amines employed in concentrations of 0.001 to 1%, preferably 0.01 to 0.05%, in each case in relation to the epoxide resin, have proven to be advantageous as stabilizing agents. For such tertiary amines, ethanolamines, such as diisopropylaminoethanol and triethanolamine, are preferred. However, for the mentioned purpose, (meth)acrylates can also be advantageously employed; in fact, in concentrations of 1 to 30%, in relation to the epoxide resin. Methacrylates, such as polypropylene-glycolmonomethacrylate are thereby preferred. Compounds of the mentioned type, which are employed in the specified concentrations, demonstrate an excellent stabilizing effect, without, however, considerably affecting the reactivity of the hardening initiators.

In addition, the reaction resin mixtures according to the invention can also contain known additives. Examples of such additives are mineral and organic fillers, as well as additives, such as thixotroping agents, degassing aids, wetting agents, adhesion promotors, dyestuffs and pigments. The additives can be used to modify the properties of the unhardened mixtures, or rather the properties of the molded material.

The reaction resin mixtures according to the invention can be hardened by means of ultraviolet radiation. In principle, all UV sources can be used as sources of irradiation, such as xenon-, tungsten-, mercury-, and metal-halogenide-radiation emitters, as well as the most different types of UV lasers, such as excimer and Nd/YAG lasers. The UV emission from the radiation emitters can follow, in this case, as continuous or pulsed emission. The wavelength spectrum, with which the hardenable mixtures are irradiated, is dependent upon the composition of the mixture and is determined by the particular application. The mixtures are preferably hardened with the UV-A spectrum of medium-pressure and high-pressure mercury emitters.

The reaction resin mixtures according to the invention can also be hardened by means of rapid thermal action, and in fact at low temperatures. Apart from the UV irradiation, a thermal hardening is also necessary, for example, in cases where electronic components and modules are coated or bonded, and—conditional upon the structural design—there are regions which are shaded from light; and/or in cases where the depth of penetration of the UV radiation into the resin does not suffice for a complete curing. The thermal hardening takes place simultaneously with the UV irradiation, or directly following it, or later in a separate thermal process. This occurs at temperatures of 80 to 200° C., preferably from 80 to 150° C. The heat required for thermal hardening can be supplied by infrared-radiation emitters, infrared lasers, or by heated circulating air. However, it is also possible to utilize the IR radiation component emitted by the UV radiation emitters, for example, as is the case with mercury- and xenon-radiation emitters, or the heat which is transmitted convectively by the hot wall of an emitter. Furthermore, it is possible for the required heat to be supplied by means of thermal conduction via the substrate or through the components.

The reaction resin mixtures according to the invention are suited for coating and bonding electronic components and modules. Furthermore, these mixtures can be formulated as adhesive systems. In this case, it can be advantageous to have a combined UV and thermal hardening process, in which the adhesive, after it is applied to a substrate or to both of the substrates to be bonded, retains its viscidity for a limited time, the substrates to be bonded being joined together within this time. Subsequent to this, the hardening of the irradiated adhesive can be completed through the supply of heat. This method is particularly suited for bonding non-transparent substrates.

The invention will be clarified in greater detail by the following exemplified embodiments which are to be regarded in an illustrative rather than a restrictive sense.

EXAMPLES 1 THROUGH 10

A base mixture is employed, which consists of 62.5 parts by weight of a cycloaliphatic epoxide resin, 25 parts by weight of epoxidized soybean oil, and 12.5 parts by weight of a cycloaliphatic alcohol. 0.5 parts by weight of a hardening initiator (as a 33% solution in propylene carbonate)and, in some instances, 0.1 parts by weight of a sensitizer (see Table 1), are added to this and dissolved with stirring at room temperature. The following benzylthiolanium-hexafluoroantimonates are employed as hardening initiators, compound (I) being a naphthyl derivative:

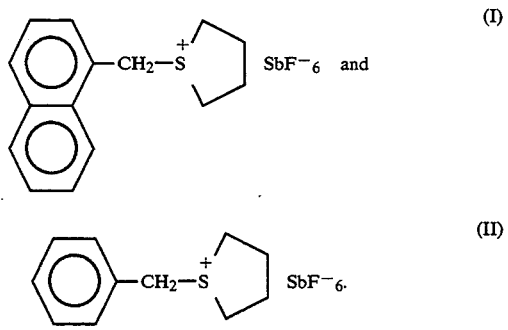

The reactivity of the reaction resin mixtures under UV irradiation, or rather when heated is determined—by means of the DSC method (differential scanning calorimetry)—on the basis of the polymerization heat being liberated (unit DSC-7, firm Perkin-Elmer, equipped with a DPA-7 (double beam photocalorimetric accessory)). The UV irradiation takes place at 366 nm (200 W Hg/Xe radiation emitters as well as monochromators). In each case, 2 to 3 mg of the mixtures are weighed in, in a small aluminum pan (layer thickness: approx. 80 μm) and irradiated with UV light in the measuring cell of the DSC unit for 5 min. The irradiation takes place at 40° C. under isothermal conditions; the power density at the location of the sample amounts to 3.5 mW/cm². Immediately following this, the sample is heated with a time-linear temperature increase with 10 K/min to 250° C. (dynamic run). A second measuring run, which is carried out under the same conditions, is subtracted from the first, to compensate for the baseline dislocation caused by the UV irradiation and the drift occurring during the dynamic run. The time from the beginning of the UV irradiation up to the peak maximum, the peak height, and the reaction enthalpy ($-\Delta H$) released during the UV irradiation are evaluated from the isothermal portion of the measuring runs; the peak maximum, the peak height and the polymerization heat ($-\Delta H$) released during the dynamic run are evaluated from the dynamic portion of the measuring runs. The results are summarized in Table 1.

TABLE 1

| Example | Initiator | Sensitizer | UV-Irradiation | | | Dynamic Run | | |
| --- | --- | --- | --- | --- | --- | --- | --- | --- |
| | | | Peak maximum (min) | Peak height (W/g) | $-\Delta H$ (J/g) | Peak maximum (°C.) | Peak height (W/g) | $-\Delta H$ (J/g) |
| 1 | I | thioxanthone | 0.18 | 3.66 | 206 | 84/147 | 0.38/0.46 | 263 |
| 2 | I | phenanthrenequinone | 0.84 | 1.43 | 198 | 80/149 | 0.37/0.55 | 280 |
| 3 | I | dibenzosuberone | 0.63 | 0.48 | 113 | 131 | 1.42 | 339 |

TABLE 1-continued

| Example | Initiator | Sensitizer | UV-Irradiation | | | Dynamic Run | | |
| --- | --- | --- | --- | --- | --- | --- | --- | --- |
| | | | Peak maximum (min) | Peak height (W/g) | -ΔH (J/g) | Peak maximum (°C.) | Peak height (W/g) | -ΔH (J/g) |
| 4 | I | 4-phenylbenzo-phenone | 0.27 | 1.46 | 183 | 86/143 | 0.34/0.47 | 282 |
| 5 | I | phenothiazine | 0.23 | 1.99 | 209 | 70/147/191 | 0.18/0.6/0.35 | 270 |
| 6*) | I | without sensitizer | no reaction | | | 130 | 2.6 | 480 |
| 7 | II | Michler's ketone | 1.05 | 0.54 | 131 | 170 | 0.8 | 373 |
| 8 | II | phenanthrenequinone | 3.5 | 0.26 | 72 | 134 | 1.06 | 412 |
| 9 | II | phenothiazine | 0.39 | 1.81 | 219 | 74/168 | 0.26/0.62 | 261 |
| 10*) | II | without sensitizer | no reaction | | | 124 | 2.03 | 497 |

*)Comparative example

As can be seen from Table 1, the reaction resin mixtures (Examples 1 through 5 and 7 through 9) exhibit a clear polymerization heat flow, i.e., a hardening of the mixtures takes place under UV irradiation. Depending on the sensitizer and hardening initiator—more or less between 15 and 45% of the entire polymerization heat is measured thereby. In contrast, no reaction takes place during the UV irradiation in the case of mixtures according to examples 6 and 10, which do not contain any sensitizer.

EXAMPLES 11 THROUGH 16

The same base mixture is used as in Examples 1 through 10, and in the same manner 0.5 parts by weight of a hardening initiator and, in some instances, 0.1 parts by weight of a sensitizer are admixed (see Table 2). The following benzylthiolanium-hexafluoroantimonates are used as hardening initiators:

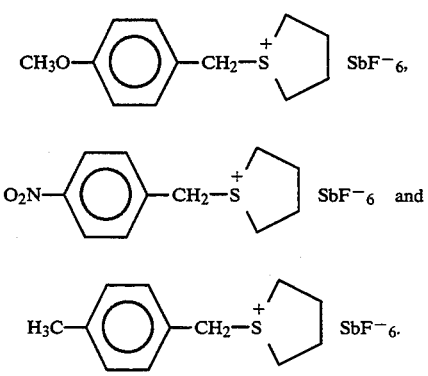

The finished reaction resin mixtures are poured in each case into a 0.5 mm deep teflon mold and irradiated with UV-A light >320 nm (Hg-metal-halogenide radiation emitter; cut-off filter having 99% absorption at 320 nm); the power density in the UV-A range at the location of the sample amounts to 30 mW/cm². After 1 min., 3 min., and 5 min., the mixtures are judged qualitatively. The results are summarized in Table 2.

As is apparent from Table 2, the reaction resin mixtures according to the invention (Examples 11, 13 and 15) demonstrate a pronounced reactivity when subjected to UV irradiation >320 nm. On the other hand, without the sensitizer, i.e., phenothiazine (Examples 12, 14 and 16), a noticeable change in the initial state is never achieved.

TABLE 2

| Example | Initiator | Sensitizer | UV-Irradiation | | |
| --- | --- | --- | --- | --- | --- |
| | | | 1 min. | 3 min. | 5 min. |
| 11 | III | phenothiazine | highly viscous | gelled | — |
| 12 | III | — | unchanged | unchanged | unchanged |
| 13 | IV | phenothiazine | gelled | — | — |
| 14 | IV | — | unchanged | unchanged | unchanged |
| 15 | V | phenothiazine | gelled | — | — |
| 16 | V | — | unchanged | unchanged | unchanged |

What is claimed is:

1. A reaction resin mixture which is hardenable with UV radiation or with UV radiation and heat, comprising:

a cationically polymerizable epoxide resin;
a latent hardening initiator of the structure

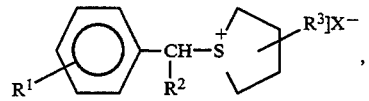

where the following applies:
$R^1$=hydrogen, alkyl, aryl, O-alkyl, S-alkyl, vinyl, $CF_3$, halogen, CN, $NO_2$ or an anellated aromatic system;
$R^2$=hydrogen, alkyl or aryl;
$R^3$=hydrogen, alkyl or aryl or the thiolane ring is a constituent of an aromatic system;
$X^-$=$PF_6^-$, $AsF_6^-$, $SbF_6^-$ or $SbF_5OH^-$, and a sensitizer of the structure

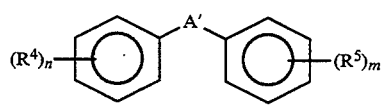

where A'=—CO— or —CO—CO—,

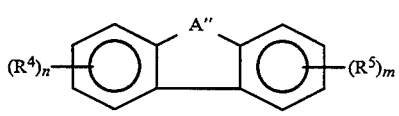

where A"=—CO—, —NR— or —CO—CO—, or

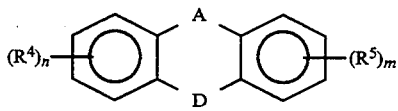

where A=—CO— or —NR— and D=—O—, —S—, —CO— or ⁅CH₂ₓ⁆ where x=1 or 2, when A=—CO—, or D=—O—, —S— or —CO— when A=—NR—, where the following applies:

R⁴ and R⁵=hydrogen, alkyl, aryl, aralkyl, O-alkyl, S-alkyl, COO-alkyl, N(alkyl)₂, halogen, OH or CN, and n and m=0, 1, 2 or 3, and wherein R is alkyl or hydrogen.

2. The reaction resin mixture according to claim 1, wherein the epoxide resin is selected from the group consisting of: a glycidyl ether based on bisphenol A-, bisphenol F- or novolaks; a linear aliphatic epoxide resin; and a cycloaliphatic epoxide resin.

3. The reaction resin mixture according to claim 1, wherein the hardening initiator is a benzyl-thiolanium—or a naphthylmethyl-thiolanium-hexafluoroantimonate.

4. The reaction resin mixture according to claim 2, wherein the hardening initiator is a benzyl-thiolanium—or a naphthylmethyl-thiolanium-hexafluoroantimonate.

5. The reaction resin mixture according to claim 1, wherein the hardening initiator is present in an amount from 0.01 to 5% by mass in relation to the epoxide resin.

6. The reaction resin mixture according to claim 2, wherein the hardening initiator is present in an amount from 0.01 to 5% by mass in relation to the epoxide resin.

7. The reaction resin mixture according to claim 1, wherein the sensitizer is a benzophenone.

8. The reaction resin mixture according to claim 7 wherein the sensitizer is 4-phenyl-benzophenone.

9. The reaction resin mixture according to claim 1, wherein the sensitizer is a phenanthrenequinone.

10. The reaction resin mixture according to claim 9, wherein the sensitizer is unsubstituted phenanthrenequinone.

11. The reaction resin mixture according to claim 1, wherein the sensitizer is a thioxanthone.

12. The reaction resin mixture according to claim 11, wherein the sensitizer is an unsubstituted thioxanthone or 2-isopropylthioxanthone.

13. The reaction resin mixture according to claim 1, wherein the sensitizer is a phenothiazine.

14. The reaction resin mixture according to claim 13, wherein the sensitizer is N-methyl-phenothiazine.

15. The reaction resin mixture accoardding to claim 1, wherein the sensitizer is present in an amount from 0.01 to 5% by mass in relation to the epoxide resin.

16. The reaction resin mixture according to claim 2, wherein the sensitizer is present in an amount from 0.01 to 5% by mass in relation to the epoxide resin.

17. The reaction resin mixture according to claim 1, further comprising a hydroxyl-group-containing organic compound.

18. The reaction resin mixture according to claim 17, wherein the hydroxyl-group-containing organic compound is selected from the group consisting of a polyoxyalkylene polyol, a polyalkylene polyol, a cycloaliphatic hydroxyl compound, and vinyl ethers thereof.

19. A coating for an electronic component or module comprising the reaction resin mixture according to claim 1.

* * * * *